(12) United States Patent
Nemoto et al.

(10) Patent No.: US 6,344,292 B1
(45) Date of Patent: Feb. 5, 2002

(54) LITHIUM SECONDARY BATTERY

(75) Inventors: Hiroshi Nemoto, Nagoya; Teruhisa Kurokawa, Ama-gun; Kenshin Kitoh, Nagoya, all of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/114,323

(22) Filed: Jul. 13, 1998

(30) Foreign Application Priority Data

Jul. 29, 1997 (JP) .............................................. 9-202963
Dec. 2, 1997 (JP) .............................................. 9-331537

(51) Int. Cl.$^7$ .......................... H01M 2/12; H01M 10/40
(52) U.S. Cl. .......................................... 429/56; 429/53
(58) Field of Search ..................................... 429/53–56

(56) References Cited

U.S. PATENT DOCUMENTS

| | | | |
|---|---|---|---|
| 4,939,050 A | * 7/1990 | Toyosawa et al. | 429/241 |
| 5,156,930 A | * 10/1992 | Daio et al. | 429/53 |
| 5,571,632 A | * 11/1996 | Teramoto | 429/94 |
| 5,589,293 A | * 12/1996 | Pope et al. | 429/172 |

FOREIGN PATENT DOCUMENTS

| | | |
|---|---|---|
| EP | 0 266 541 A1 | 5/1988 |
| EP | 0 690 517 A1 | 1/1996 |
| EP | 0 771 040 A2 | 5/1997 |
| EP | 0 855 752 A2 | 7/1998 |

* cited by examiner

*Primary Examiner*—Gabrielle Brouillette
*Assistant Examiner*—Jonathan Crepeau
(74) *Attorney, Agent, or Firm*—Parkhurst & Wendel, L.L.P.

(57) ABSTRACT

A lithium secondary battery includes a battery case, and an internal electrode body contained in the battery case and including a positive electrode and a negative electrode wound through a separator film made of porous polymer, and uses a nonaqueous organic electrolyte. Opposing pressure release mechanisms are disposed at both ends of the battery case in the winding direction of the positive electrode and the negative electrode. The lithium secondary battery is simple in fabrication, has small internal resistance, and is superior in safety. Preferably, the ratio of the total area of opening portions where the pressure release mechanisms operate to the battery capacity is kept within a predefined range.

33 Claims, 8 Drawing Sheets

(UNIT:mm)

Fig.11 (a)    Fig.11 (b)
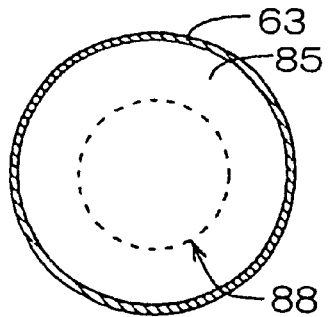 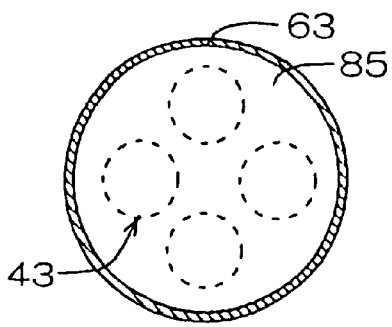
Fig.12 (a)    Fig.12 (b)
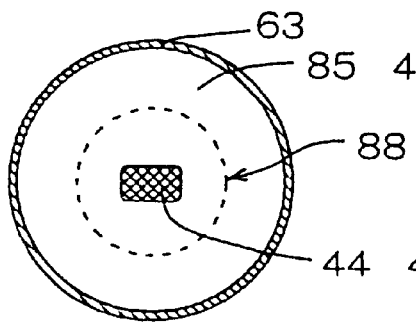 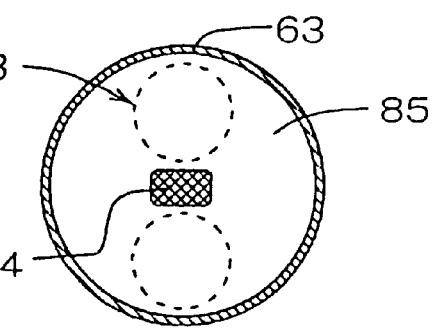
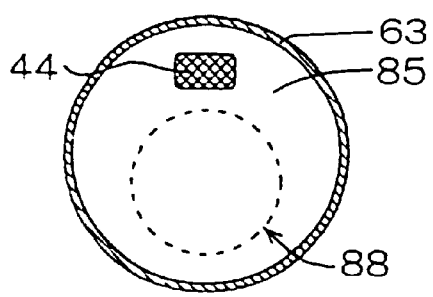 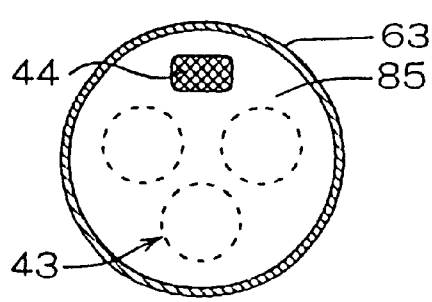
Fig.12 (c)    Fig.12 (d)

LITHIUM SECONDARY BATTERY

BACKGROUND OF THE INVENTION AND RELATED ART STATEMENT

The present invention relates to a lithium secondary battery which can be easily fabricated, has small internal resistance, and is superior in operational safety.

Attention has been paid to realization of practical use of a lithium secondary battery as a secondary battery which is small, has a large energy density, and can be charged and discharged, and which can be used as a power source for an electric equipment such as a portable communication equipment and a notebook-sized personal computer, the electric equipment being rapidly miniaturized in recent years. Moreover, concerns for resource saving and energy saving are raised on the background of international protection of the earth environment, and that is one of the reasons why the lithium secondary battery is expected as a motor driving battery for an electric vehicle which is under consideration for the positive introduction to the market in the automobile industry, or also as an effective means for using electric power by storing the electric power in the night. Thus, it is eagerly desired to put a large capacity lithium secondary battery, which is suitable for these uses, into early practical use.

In the lithium secondary battery, a lithium transition metal compound oxide or the like is used as a positive active material, while a carbon material such as hard carbon or graphite is used as a negative active material. At charging, lithium ions in the positive active material are transferred to and captured by the negative active material through an electrolyte obtained by dissolving a lithium ion electrolyte in an organic solvent. At discharging, a reverse battery reaction occurs.

Like this, the lithium secondary battery is a secondary battery which can be charged and discharged, and has properties that its voltage is higher than a conventional manganese battery and its energy density is high. Thus, the lithium secondary battery is provided with a safety mechanism for preventing accidents such as a burst of the battery caused from the rise of a battery temperature by abnormalities at the time of charging or discharging, for example, over-discharging due to a short circuit of an output terminal, rapid charging or over-charging due to malfunction of a charging device, application of a reverse connection potential by erroneous use of a user, and the like.

In a small battery as an example, as shown in FIG. 13, one end of a positive lead line 11 is connected to a positive electrode (not shown), and the other end thereof is connected to an internal terminal 13 having a communicating hole 12. The internal terminal 13 is electrically connected to a pressure switch plate 15 having a burst groove 14 through contact B. The pressure switch plate 15 is connected to an output terminal 17 through a PTC element 16. The internal terminal 13 and the pressure switch plate 15 are isolated from each other through an insulator 18 so that when the contact B is separated by the increase of internal pressure of the battery, the electrical conduction is lost. Reference numeral 19 denotes a battery case.

In the battery having such a safety mechanism, in the case where the temperature of the battery itself is raised due to the occurrence of an abnormality in the state of use of the battery, when the PTC element 16 reaches a predetermined temperature, the resistance thereof is abruptly increased so that current hardly comes to flow. As a result, the battery reaction is restrained and the rise of temperature is suppressed.

Here, as this kind of PTC element 16, a mixture of conductive particles and polymer is generally used. The mixture has such properties that at room temperature, the mixture has low resistance since the conductive particles form a current path, while at a temperature higher than a certain temperature, the mixture comes to have high resistance close to an insulator since the molecular structure of the polymer is changed so that the current path formed of the conducive particles is cut to pieces, and when the temperature lowers again, the polymer returns to the original structure so that the current path of the conductive particles is again formed and the resistance is returned to a low resistance value.

If the internal pressure of the battery is increased although a current is restricted by the PTC element 16, and the internal pressure exceeds the welding strength of the contact B between the pressure switch plate 15 and the internal terminal 13, the contact B separates so that the connection between an internal electrode body and the output terminal 17 is completely cut off and the battery reaction comes not to occur. However, if the internal pressure is increased in spite of this, the burst groove 14 bursts so that the internal pressure of the battery is released to the atmospheric pressure, that is, such a structure is adopted that the pressure release mechanism operates.

In addition to the above described various safety mechanisms, such a safety mechanism is provided that by using a porous macromolecular film, such as polyethylene with a low softening point, as the separator for separating the positive electrode from the negative electrode in the internal electrode body, when the battery temperature is raised, the separator film is softened and micro pores formed in the film are collapsed so that the movement of lithium ions is blocked and the battery reaction is suppressed.

Accordingly, also in a large capacity lithium secondary battery, it is conceivable that such various safety mechanisms as are installed in a small lithium secondary battery as described above must be indispensably installed.

However, since the resistivity of the above-mentioned PTC element made up of the conductive particles and polymer is about 1 Ω·cm at room temperature, the internal resistance of the battery becomes large to cause output loss, and the PTC element may cause the discharge characteristics to lower and the lifetime of the battery to shorten. Especially, in the case where such a PTC element is installed in a large capacity battery, the concentration of current in the inside of the PTC element is apt to occur due to the increase of an area of the PTC element, which causes heat generation, so that the installation to a large capacity battery is difficult. In addition, such a PTC element is generally expensive, and a large one in size is not manufactured, so that a current control element which is more inexpensive, is capable of dealing with a large battery, and has low resistance, is earnestly desired.

According to the Battery Association of Japan, as a mechanical test (erroneous use test) of a lithium secondary battery safety estimation guideline, it is regulated that even if an abnormal discharge current abruptly flows by an internal short circuit of electrodes which is caused by driving a nail (metal rod) in a surface (lamination surface) so that the nail pierces vertically electrode plates of a lithium secondary battery, which is fully charged in the charging capacity, the electrode plates being overlapped with each other on the surface, the battery does not burst, does not fire, and the safety can be secured (such a test will be hereinafter referred to as a nail piercing test).

As a result of the foregoing nail piecing test carried out by the present inventors for a small lithium secondary battery (battery capacity 1.5 Ah or less), it was confirmed that safety was able to be sufficiently secured for the battery in which a pressure releasing mechanism was provided at an electrode side of only one end.

However, in the case where the nail piecing test was carried out for the below-mentioned lithium secondary battery which has a wound cylinder-shape and a large capacity, employs an inner electrode body, and was made an airtight structure and in which a pressure releasing mechanism was provided at one end and the pressure release mechanism was not provided at the other end, it was confirmed that the pressure release mechanism was normally operated at the end of the battery where the pressure releasing mechanism was provided, and a burst groove burst so that the internal pressure of the battery was released to the atmospheric pressure and a small amount of vapor of an electrolyte flowed out. On the contrary, it was confirmed that the end where the pressure release mechanism was not provided, burst so that not only partial pieces of the battery case and the vapor of the electrolyte, but also partial materials of the positive electrode or negative electrode were scattered.

The present inventors presumed that the result of the nail piecing test for the large capacity lithium secondary battery was caused since an overcurrent at the short circuit was larger than that of the small battery beyond comparison, vaporization or decomposition of the electrolyte due to the temperature rise of the battery was rapidly progressed so that the internal pressure of the battery was raised. On the other hand, the small lithium secondary battery in which the pressure release mechanism was provided only at one portion, met the nail piecing test. From these results, it is conceivable that the structure and installation state of a pressure releasing mechanism which operates without fail is related to the battery capacitance.

However, the relation between the battery capacitance and the opening area at the operation of the pressure release mechanism has not been clarified. That is, if the opening area at the operation of the pressure release mechanism is small, clogging occurs on the way to the pressure release of the internal pressure, so that the pressure release is not sufficiently carried out and there is a fear that such an accident as burst or firing of the battery would occur. On the other hand, if the opening area is large, although the fear of clogging can be removed, there is a fear that the constituents of the internal electrode body would jump out, or firing or combustion would occur when the internal electrode body jumps out in the state of the internal short circuit. However, conditions for preventing the occurrence have not been clear.

Thus, there are often cases where the battery case itself becomes large since w an unnecessarily large pressure release mechanism for battery capacity is disposed, or such restriction in configuration is imposed that although a battery of thin and long cylindrical shape is desired to be formed, a flat plate structure must be adopted while a battery capacity remains, since a large pressure release mechanism must be disposed.

Then the present inventors considered the structure, operational condition, and installation position of a pressure release mechanism for a large capacity lithium secondary battery with superior safety and low resistance, which is able to release a large pressure generated in the inside of the battery due to an electrode short circuit and the like to the atmospheric pressure, and as a result, the present invention has been achieved.

SUMMARY OF THE INVENTION

According to an aspect of the present invention, there is provided a lithium secondary battery, comprising:

a battery case;

an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

an organic electrolyte contained in the battery case; and a pressure release mechanism disposed at each of both end portions of the battery case in a winding direction of the positive electrode and the negative electrode.

Such a structure of the lithium secondary battery is preferably adopted for the case where a cylinder-shaped battery case is used. At least one pressure release mechanism is suitably disposed in each of the end portions of the battery case.

Further, according to another aspect of the present invention, there is provided a lithium secondary battery, comprising:

a battery case;

an internal electrode body contained in the battery case and including a positive electrode, a negative electrode, and a separator made of porous polymer, the positive electrode and the negative electrode being laminated through the separator so that the positive electrode and the negative electrode are not brought into direct contact with each other;

an organic electrolyte contained in the battery case; and at least one pressure release mechanism disposed on a side surface, perpendicular to flat surfaces of said positive electrode and said negative electrode, of the battery case.

The pressure release mechanism is preferably disposed on each of at least one pair of facing side surfaces of the battery case.

In the foregoing lithium secondary battery of the present invention, when the battery capacity is C (Ah) and the total area of opening portions where the pressure release mechanisms operate is S ($cm^2$), it is preferable that the lithium secondary battery is so designed that the relation of $0.05 \leq S/C \leq 2$ is established. In addition, it is preferable that the operation pressure of the respective pressure release mechanisms is 2 to 10 $kg/cm^2$, and the difference between the operational pressures of the respective pressure release mechanisms is 8 $kg/cm^2$ or less.

According to still another aspect of the present invention, there is provided a lithium secondary battery, comprising:

a battery case;

an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

an organic electrolyte contained in the battery case; and at least one pressure release mechanism disposed in one end portion of the battery case in a winding direction of said internal electrode body, wherein when the total area of an opening portion where the pressure release mechanism operates is S (cm$^2$) and capacity of the lithium battery is C (Ah), the relation of $0.5 \leq S/C \leq 2$ is established.

According to yet another aspect of the present invention, there is provided a lithium secondary battery, comprising:

a battery case;

an internal electrode body contained in the battery case and including a positive electrode, a negative electrode, and a separator made of porous polymer, the positive electrode and the negative electrode being laminated through the separator so that the positive electrode and the negative electrode are not brought into direct contact with each other;

an organic electrolyte contained in the battery case; and at least one pressure release mechanism disposed on a side surface perpendicular to flat surfaces of said positive electrode and said negative electrode or on each of at least two of not facing side surfaces, of the battery case, wherein when the total area of an opening portion where the pressure release mechanism operates is S (cm$^2$) and capacity of the lithium battery is C (Ah), the relation of $0.5 \leq S/C \leq 2$ is established.

In the foregoing all lithium secondary batteries of the present invention, it is preferable to install the pressure release mechanism having such a structure that a metal foil is burst, or a groove portion is formed in a metal plate and the groove portion is burst, so that the internal pressure of the battery is released to the outside pressure. Moreover, it is preferable to use aluminum for the metal foil or metal plate used in this way when it is installed at the positive side, and copper or nickel when it is installed at the negative side. Moreover, it is preferable that an opening area of such a pressure release mechanism is 0.1 cm$^2$ or more.

Such structural condition of the lithium secondary battery of the present invention is preferably adopted for a battery having a battery capacitance of 5 Ah or more, and can be preferably used for an electric vehicle or a hybrid electric vehicle.

As described above, according to the lithium secondary battery of the present invention, not to mention an internal short circuit, even in the case where a battery temperature is raised by overcharging due to an external short circuit or the like so that the internal pressure of the battery is increased, since the pressure release mechanism is disposed in a suitable shape for the battery capacitance and at a suitable place, the entire battery does not burst or explode, and superior safety is obtained. Moreover, even in the case where the pressure release mechanism functions also as a current path, since the pressure release mechanism is made of metal material members, the internal resistance of the battery is small and the battery is superior in charging and discharging characteristics.

BRIEF DESCRIPTION OF THE DRAWINGS

FIGS. 11(a) and 11(b) are plan views each showing a mode for carrying out a disposition of the pressure release mechanism due to a V-shaped groove.

FIGS. 12(a)–12(d) are plan views each showing a mode for carrying out positioning of the output terminal and the pressure release mechanism.

DETAILED DESCRIPTION OF PREFERRED EMBODIMENT

Preferred embodiments of the present invention will next be described with reference to the drawings. However, it should be noted that the present invention is not limited to those embodiments.

Figure 8:
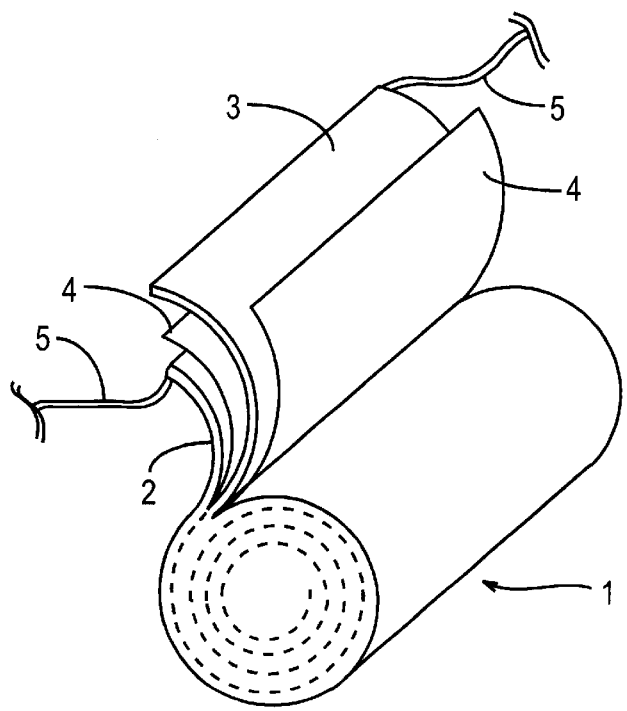
FIG. 8 is a perspective view showing an example of a structure of a wound-type internal electrode body used for the lithium secondary battery.

A structure of a lithium secondary battery of the present invention is divided into a wound type and a lamination type. A lithium secondary battery of a wound type has such a structure that, as shown in the perspective view of FIG. 8, a battery case contains an internal electrode body 1 formed by winding a positive electrode 2 and a negative electrode 3 through a separator film 4 of porous polymer so that the positive electrode 2 and the negative electrode 3 are not brought into direct contact with each other. In the case of such a wound-type, the number of lead lines 5 from the respective electrode plates 2 and 3 may be at least one. Even in the case where electricity collection resistance from the respective electrode plates 2 and 3 is desired to be made small, it is sufficient to merely increase the number of lead lines. Thus, the wound-type has an advantage that assembling of the battery is easy.

Figure 1:
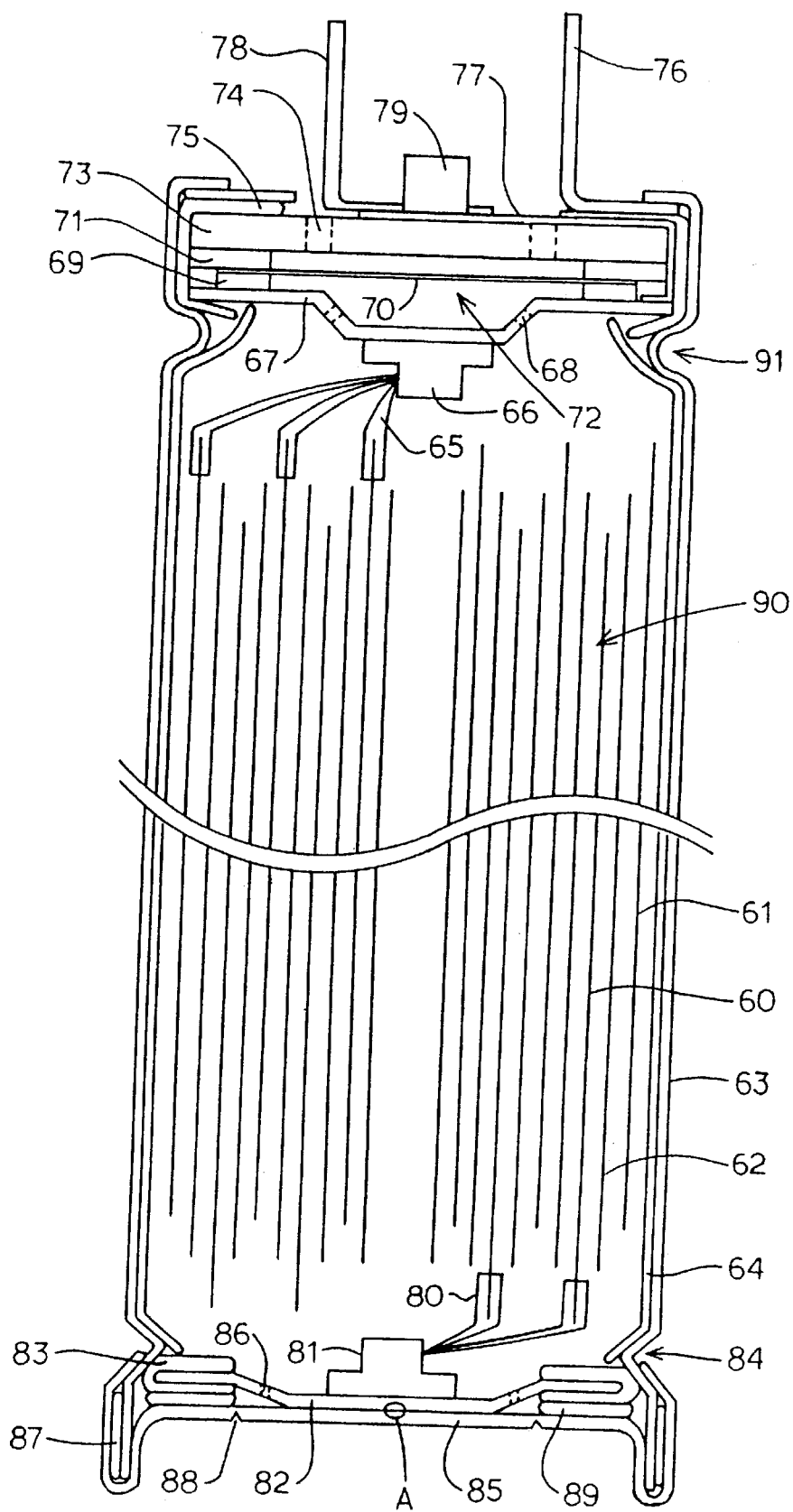
FIG. 1 is a sectional view showing an embodiment of a lithium secondary battery of the present invention.

FIG. 1 is a sectional view showing an embodiment of a lithium secondary battery of the present invention using an internal electrode body 1. Similarly to FIG. 8, a positive electrode 60 is insulated from a negative electrode 61 through a separator film 62, and these are wound to constitute an internal electrode body 90. At this time, the positive electrode 60 and the negative electrode 61 are wound while the positions in the vertical direction are shifted so that connection to lead lines for electricity collection becomes easy. The thus formed internal electrode body 90 is inserted into an aluminum cylindrical battery case 63. At this time, the inner surface of the battery case 63 is coated with a polypropylene sheet 64 in order to avoid direct contact with the respective electrode plates 61 and 62.

Here, as the positive electrode 60, it is preferable to use an aluminum foil coated with lithium cobalt oxide (LiCoO$_2$), lithium nickel oxide (LiNiO$_2$), or lithium manganese oxide ($LiMn_2O_4$) as a positive active material, which is mixed with carbon powder to improve the conductivity. It is determined according to the purpose, use condition, cost and the like of the battery which positive active material among such positive active materials should be used. As the carbon powder, acetylene black, graphite powder, or the like may be used.

Further, it is preferable to use a high purity material for aluminum members used in the present invention, for example, the aluminum foil constituting the positive electrode 60, and the battery case 63, in order to prevent the battery performance from lowering due to corrosion by an electrochemical reaction of the battery.

On the other hand, for the negative electrode 61, it is preferable to use a copper foil coated with an amorphous carbon material such as soft carbon or hard carbon, or carbon powder such as natural graphite or highly graphitized carbon material, as a negative active material. Here, similarly to the aluminum members used for the positive electrode, it is preferable to use a high purity material for the copper foil used as the negative electrode 61, and for other copper members used in the lithium secondary battery of the present invention, in order to withstand the corrosion due to an electrochemical reaction.

Although it is needless to say that the above-mentioned carbon material used for the negative electrode has properties to adsorb and desorb lithium ions, it is known that a part of the lithium ions adsorbed to the carbon material at the initial charging reaction of the battery becomes the so-called dead lithium which is kept adsorbed to the carbon material and does not contribute to the subsequent charging and discharging reactions, so that the capacity of the battery is lowered. Thus, it is preferable to select a material in which the amount of the dead lithium is small.

As a material of the separator 62, it is preferable to use a three-layer structural material in which a polyethylene film having lithium ion permeability and including micropores is sandwiched between porous polypropylene films having lithium ion permeability. This serves also as a safety mechanism in which when the temperature of the internal electrode body 90 is raised, the polyethylene film is softened at about 130° C. so that the micropores are collapsed to suppress the movement of lithium ions, that is, the battery reaction. When the polyethylene film is sandwiched between the polypropylene films having a softening temperature higher than the polyethylene film, it is possible to prevent the contact/welding between the separator film 62 and the positive and negative electrodes 60, 61.

As the electrolyte which is impregnated in the internal electrode body 90 and is filled in the battery case 63, it is preferable to use a nonaqueous organic electrolyte including a single solvent or a solvent mixture of organic solvents such as ethylene carbonate, propylene carbonate, γ-butyrolactone, diethyl carbonate, tetrahydrofuran, and acetonitrile, and one or more kinds of $LiRF_6$, $LiClO_4$, $LiBF_4$, and lithium halide as an electrolyte dissolved in the solvent. Further, it is also possible to use a macromolecular solid electrolyte or the like formed by gelating and solidifying the thus formed electrolyte.

Next, the structure of a negative side in the upper portion of the battery in FIG. 1 will be described. The negative electrode 61 is connected to leads 65 preferably at plural portions by resistance welding, ultrasonic welding, or the like. By carrying out the electricity collection from the plural portions in this way, as compared with the case where the electricity collection is carried out from only one portion, it becomes possible to lower the resistance of electricity collection from the wound negative electrode 61, and becomes possible to improve the output of the battery.

Such a means comes to play an important role in decreasing the resistance of electricity collection as the area of an electrode plate is made large in accordance with the increase of capacity of a battery. Incidentally, as a material of the lead 65, it is preferable to use copper which is superior in conductivity and corrosion resistance against an electrolyte, like the negative electrode 61.

The thus provided leads 65 are gathered to a copper rivet 66 and are electrically connected thereto so that electricity collection is carried out. This copper rivet 66 is connected to a negative internal terminal 67 of copper by welding or the like. A contrivance is made so that the negative internal terminal plate 67 does not slip down in the direction of the internal electrode body 90 by a squeezed portion 91 provided on the battery case 63. The lead lines 65 may be fixed by a screw instead of the copper rivet 66.

A first seal ring 69 is stacked on the negative internal terminal 67, a metal foil 70 is stacked on the first seal ring 69, and a second seal ring 71 is overlapped on the metal foil 70 so that the metal foil 70 is sandwiched between the first seal ring 69 and the second seal ring 71, and a pressure release hole 72 is formed at the center of the metal foil. The negative internal terminal 67 is provided with a communication hole 68 so that the internal pressure of the battery is applied to the metal foil 70.

The pressure release hole 72 bursts to release the internal pressure to the atmospheric pressure when the internal pressure of the battery is raised. The operational pressure thereof is determined by hole diameters of the first and second seal rings 69, 71 and the thickness and strength of the metal foil 70. Although it is preferable to use copper, which is preferably used for the negative electrode material, for a material of the metal foil 70 in view of reactivity to the electrolyte, a nickel foil may be used.

An insulating plate 73 is disposed on the second seal ring 71, and the upper end of the battery case 63 is bent to be subjected to caulking, so that the negative internal terminal 67 and the like are fixed in the battery. The insulating plate 73 is provided with a communication hole 74 to release the internal pressure of the battery at the burst of the metal foil 70 at the pressure release hole 72 to the atmospheric pressure. A hard insulating resin such as Bakelite is preferably used for the material of the insulating plate 73. Instead of using the second seal ring 71, the insulating plate 73 may be modified to have the function of the second seal ring 71 so that the metal foil 70 is sandwiched between the first seal ring 69 and the insulating plate 73.

In order to insulate the negative internal terminal 67 from the battery case 63, a heat shrinkage tube 75 is inserted between the negative internal terminal 67 and the battery case 63. Moreover, as described later, since the battery case 63 functions as a current path at the positive side, a positive output terminal 76 is inserted and fixed between the battery case 63 and the heat shrinkage tube 75 at the bent position of the upper end of the battery case 63. A conductive member 77 for connecting the negative internal terminal 67 to the outside is disposed at a part of the outer circumference of the insulting plate 73, and is assembled and fixed so as not to come in contact with the positive output terminal 76, whereby the negative side of the battery case 63 is sealed (made airtight).

When elastomer resin such as ethylene-propylene rubber is used for the thermal shrinkage tube 75, there are obtained such effects that the adhesion becomes excellent and the sealing becomes more complete. As the positive output terminal 76, the same material as the electrode material, such as aluminum or copper, is the most easily handled material. The shape of the positive output terminal is preferably such a flat ring shape that it is brought into uniform contact with the sealing portion of the battery case 63, and a terminal for connection to a load is protruded from a part thereof. One end of the conduction member 77 extending from the negative internal terminal 67 is electrically connected to the negative output terminal 78 and is fixed to the insulating plate 73 by a screw 79 or the like.

Next, the structure of a positive side in the lower portion in FIG. 1 will be described. The positive electrode 60 and leads 80 are connected to each other at plural portions by resistance welding, ultrasonic welding or the like. The reason why the electricity collection is carried out from the plural portions in this way is the same as the electricity collection at the negative electrode 61. As a material for the leads 80, aluminum identical to the material of the positive electrode 60 is preferably used.

These leads 80 attached to the positive electrode 60 are connected to an aluminum rivet 81 and electricity collection is made. The rivet 81 is integrated with a positive internal terminal plate 82 of aluminum by welding.

The positive internal terminal plate 82 is positioned by a caulking portion 84 provided on the battery case 63 through an insulating heat shrinkage tube 83 so as to prevent the positive internal terminal plate from coming in direct contact with the inner surface of the battery case 63. A part of the positive internal terminal plate and an aluminum battery cap 85 as a bottom of the battery forms contact A through welding. Further, the positive internal terminal plate 82 is provided with a communication hole 86, so that the internal pressure of the battery is sensed by the battery cap 85.

Moreover, the battery cap 85 is mechanically press contacted by caulking to the side of the battery case 63 through a dissolving polypropylene 87 as a sealing material in such a manner that the battery cap is electrically connected to a part of the inner surface of the battery case 63. As a result, the inside of the battery is completely sealed. In this way, a current path from the positive electrode 60 to the positive output terminal 76 is formed.

A V-shaped groove 88 is formed in the battery cap 85 by a method such as discharge working, and the thickness of the battery cap 85 is thin and the mechanical strength is weakened at this portion. Further, although a polypropylene ring 89 is inserted between the positive internal terminal plate 82 and the battery cap 85 to stabilize the positive internal terminal plate 82, the ring may be omitted according to the shape of the positive internal terminal plate 82.

The order of sealing of the battery case 63 at the positive electrode and negative electrode finally carried out at the assembling steps of the battery having the above-mentioned structure does not matter. Since the battery case 63 forms a current path, it is preferable to make such insulating treatment that the outer surface of the battery case 63 is wrapped with an insulating plastic film or the battery itself is contained in an insulating container.

Next, the reason why the above described pressure release mechanism of the lithium secondary battery is provided, and the operation mode thereof will be described.

In the case where the temperature of a battery is raised by some cause such as generation of an overcurrent due to a short circuit between electrodes, gas by evaporation or decomposition of an electrolyte is generated. At this time, the gas does not permeate the positive electrode 60 and the negative electrode 61 constituting the internal electrode body 90 (wound portion), and the internal electrode body 90 is contained in the battery case 63 in such a state that the internal electrode body is brought into press contact with the wall of the battery case 63. Thus, the generated gas is forced to be released to the outside from the end surface of the internal electrode body 90 in the winding axis direction. Accordingly, gas pressure is directly applied to the end of the battery case 63.

In such a state, for example, even if the pressure release mechanism is provided at the side of the cylinder of the battery case 63 in parallel to the winding surface of the internal electrode body 90, since the battery case 63 and the internal electrode body 90 are brought into close contact with each other and it is hard for the gas to permeate, sufficient gas pressure is not applied to the pressure release mechanism so that the mechanism often does not function. Accordingly, it is preferable to provide the pressure release mechanism at the end of the battery case 63 to which the gas pressure is directly applied.

Moreover, as the distance between both ends of the battery case 63 is prolonged so as to make the capacity of a battery large, the gas generated at the center of the internal electrode body 90 becomes hard to be released from the internal electrode body 90 to the outside. Thus, in the case where the pressure release mechanism is disposed at only one end of the battery case, even if the pressure release mechanism operates, at the other end of the battery case 63 where the pressure release mechanism is not disposed, if clogging of the pressure release mechanism is caused by the constituent of the internal electrode body 90, decompression is delayed while the pressure in the space is raised, and when the decompression speed is lower than the rising speed of the pressure, a possibility of burst becomes strong.

Accordingly, in the present invention, in order to obviate such an accident, such a battery structure is adopted that the pressure release mechanism is disposed at both ends of the battery case in the winding axis direction when the internal electrode body 90 is of a wound-type as shown in the embodiment of FIG. 1, so that the generated gas is almost uniformly released to the ends of the battery case 63. Based on such a reason for disposing the pressure release mechanism, the present invention is particularly effective when a cylinder-shaped battery case is employed.

In the lithium secondary battery shown in FIG. 1, in the case where abrupt overcurrent discharge is caused by a short circuit between the output terminals 76 and 78, or by an internal short circuit similar to the nail piercing test, so that the battery temperature is raised and the internal pressure of the battery is raised in accordance with the temperature rise, the internal pressure of the battery at the positive electrode side is sensed by the battery cap 85, and the contact A is separated when the internal pressure of the battery exceeds the welding strength of the contact A. As a result, when a current has flown to an outside circuit, the current is completely cut off.

Subsequently, in the case where at the short circuit between the output terminals 76 and 78, the internal pressure of the battery is raised though the contact A is separated to cut off the current path so that the battery reaction is suppressed, or in the case where discharge due to the internal short circuit is continued, when the internal pressure becomes higher than the mechanical strength of the V-shaped groove 88 formed in the battery cap 85, at the positive side, the V-shaped groove 88 bursts so that the internal pressure of the battery is released, and accidents such as burst of the battery itself can be obviated.

On the other hand, at the negative side, the internal pressure of the battery is sensed by the metal foil 70 through the communication hole 68 provided in the negative internal terminal 67 according to the increase of the internal pressure of the battery, and when the internal pressure of the battery exceeds a predetermined value, the metal foil 70 bursts so that the internal pressure of the battery is released to the atmospheric pressure through the communication hole 74 provided in the insulating plate 73.

At this time, even if the pressure release mechanisms with different structures from each other are disposed at both ends of the battery case 63 as shown in FIG. 1, it is sufficient if they operate at almost equal pressures. Moreover, it is also acceptable that, for example, the same pressure release mechanism as that at the positive side is disposed at the negative side so that the similar pressure release mechanisms are disposed at the both ends. It is preferable to set the operational pressure at 2 to 10 kg/cm$^2$ from examples described later.

The reason is as follows. That is, if the operational pressure is less than 2 kg/cm$^2$, since the inner pressure of a battery becomes high by the rise of a battery temperature even in a normal use state, the pressure release mechanism operates unnecessarily to make the battery unusable. On the other hand, if the operational pressure is higher than 10 kg/cm$^2$, there arises a possibility that the burst of a battery is caused by damage of press contact portions such as a caulking portion of the positive and negative electrode portion prior to the operation of the disposed pressure release mechanism. Thus, the pressure outside the above range is not preferable. Incidentally, the operational pressure means a pressure difference between the inside and the outside of the battery.

In addition, in order to secure the safety by preventing such an accident that although one pressure release mechanism operates, the other does not operate so that he battery bursts, it is preferable to make the difference in the operational pressure of the opposite pressure release mechanisms 8 kg/cm$^2$ or less.

Moreover, as in the foregoing lithium secondary battery, when the pressure release mechanisms are disposed at both ends, it is preferable to design the battery so that when the battery capacity is C (Ah), and the total area of the opening portion where the pressure release mechanisms operate, is S (cm$^2$), the relation of $0.05 \leq S/C \leq 2$ is established.

In the case where S/C is less than 0.05, that is, in the case where the area of the opening portion at the operation of the pressure release mechanism is small relative to the battery capacity, there is a possibility that the opening portion is clogged by the members constituting the internal electrode body or the like at the release of the internal pressure, so that the pressure release is not sufficiently carried out and accidents such as burst or firing of a battery is caused. Thus, the case is not preferable.

On the other hand, in the case where S/C is larger than 2, that is, in the case where the opening portion at the operation of the pressure release mechanism is large relative to the battery capacity, although the fear of clogging is removed, there is a fear that a part of the internal electrode body or components of the battery would jump out from the opening portion, or when a part of the internal electrode body jumps out in the state of a short circuit, inflammable materials around the battery would be fired or burned. Thus, the case is not preferable. Moreover, there is a disadvantage that the battery case must be unnecessarily made large for the battery capacity. Further, since such restriction of configuration that the end area of the battery case must be large is added, there may occur an undesirable case for designing to save a mounting space of the battery.

Figure 10:
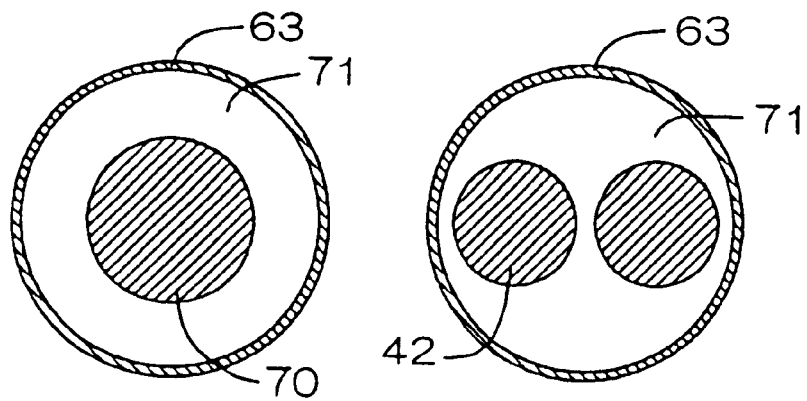
FIGS. 10(a) and 10(b) are plan views each showing a mode for carrying out a disposition of the pressure release mechanism due to a metal foil.
Figure 13:
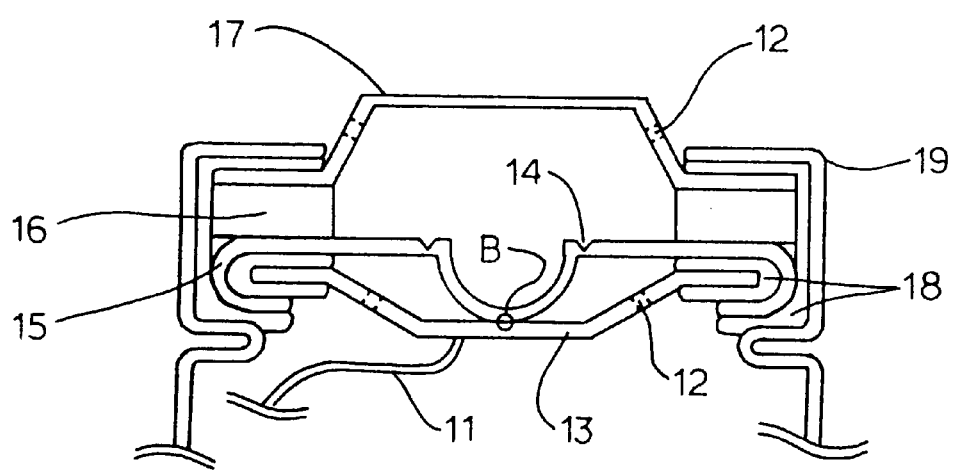
FIG. 13 is a sectional view showing a safety mechanism of a conventional small lithium secondary battery.

Though a pressure release mechanism is disposed in each of the end portions of the battery case 63 in the lithium secondary battery shown in FIG. 1, more than one pressure release mechanism may be disposed in each of the end portions of the battery case 63. For example, FIG. 10(a) is a plan view of conditions of disposing the metal foil 70 in FIG. 1 viewed from the direction of extension of the winding axis of the inner electrode body 90. In addition to such a structure, the safety equal to that obtained in the case employing the metal foil 70 can be secured as long as the area of opening portions is within the range satisfying $0.05 \leq S/C \leq 2$ even if more than one metal foil 42 is disposed as in FIG. 10(b).

A plurality of pressure release mechanisms are provided in the same manner as in the case employing the V-shaped groove 88. In this case, a required pressure release area may be secured by arranging pressure release mechanism due to a plurality of V-shaped grooves 43 as shown in FIG. 11(b) instead of forming a V-shaped groove 88 in a shape of a circle as shown in FIG. 11(a).

By the way, when a pressure release mechanism in which the V-shaped groove 88 is used is formed on an end surface of a battery, it has a risk of breakage. In the case of not only FIG. 11(a) but also FIG. 11(b), the pressure release mechanisms have a possibility of breakage by hitting the end surface provided with a V-shaped groove 88 of the battery against an obstacle. When an output terminal 44 is disposed inside the pressure release mechanism due to the V-shape groove 88, the V-shaped groove 88 is broken by external force applied to the output terminal 44 when batteries are connected with each other, thereby increasing a risk of breakage of the pressure release mechanism.

Therefore, the risk of breakage of the V-shaped groove 43 by external force applied to the output terminal 44 can be reduced by disposing the output terminal 44 in a different position from the position where the V-shaped groove 88 is formed as shown in FIG. 12(b). In addition to FIG. 12(a), as shown in FIGS. 12(c) and 12(d), it is also effective in avoiding breakage of the pressure release mechanism using the V-shaped groove(s) 88 or 43 to shift the position of the output terminal 44 to a peripheral portion lest the output terminal should be disposed in the V-shaped groove(s) 88 or 43.

As described above, although the setting ratio of the opening areas of the disposed pressure release mechanisms is not specifically restricted, as described above, it is preferable to make the opening area of the pressure release mechanism 0.1 cm$^2$ or more in order to definitely operate the opposite pressure release mechanisms and to secure the safety by making the difference in the operational pressure of the opposite pressure release mechanisms preferably not larger than 8 kg/cm$^2$, and by making the operational pressure preferably not larger than 10 kg/cm$^2$.

Figure 9:
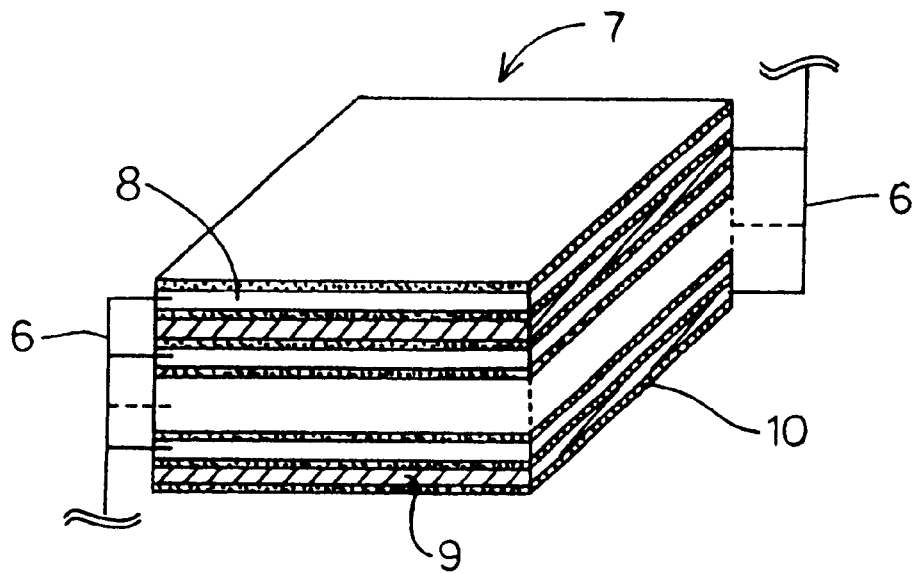
FIG. 9 is a perspective view showing an example of a structure of a lamination-type internal electrode body of the lithium secondary battery.

The lithium secondary battery employing the wound-type internal electrode body has been described. It is needless to say that such pressure release mechanism can be applied to the lithium secondary battery including a lamination-type internal electrode body. As shown in the perspective view of FIG. 9, a lamination-type internal electrode body 7 is such that a positive electrode 8 and a negative electrode 9 are laminated on each other through a separator 10. Although the area of the positive electrode 8 or the like per one piece is not large, the total electrode area can be made large by laminating a plurality of plates. Moreover, there is an advantage that the shape of the formed internal electrode body 7 may be arbitrarily designed into a rectangular parallelepiped, a disk, or a cylinder by the shape of the electrode plates 8 and 9, and the number of laminated plates. However, since a lead line 6 is required for the respective electrode plates 8 and 9, the inside of the battery becomes complicated so that the lamination-type is inferior to the wound-type in view of the assembling operation of the battery. Incidentally, when such lamination-type internal electrode body 7 is used, instead of the separator 10, it is also possible to use a solid electrolyte of an organic or inorganic material having functions of both the separator 10 and the electrolyte.

In the case of the lithium secondary battery using such a lamination-type internal electrode body, a pressure release mechanism is disposed at the side of the electrode plate, that is, at the side of the battery case corresponding to the side of the lamination surface of the internal electrode body in the outer circumferential direction. The reason for this configuration is the same as the case where in the lithium secondary battery using the wound-type internal electrode body, the pressure release mechanism is disposed at the end portion in the winding axis direction, that is, the end portion of the battery case corresponding to the side of the electrode plate.

At this time, in general, if the capacity of the battery is the same, it is preferable to make the volume small, and also it is preferable to design the structure so that serial and parallel connection of batteries is easy. Thus, it is preferable to dispose a pressure release mechanism and an output terminal respectively on the side portions opposite to each other with respect to the center of a flat surface of an electrode plate. For example, if the internal electrode body is shaped into a rectangular parallelepiped, such an example may be shown that both the output terminal and the pressure release mechanism are disposed on each of a pair of opposite sides of a rectangular parallelepiped battery case, and a superfluous space is not provided at the other pair of sides to such a degree that the internal electrode body is in contact with the battery case.

With respect to the disposed pressure release mechanism, even in the lithium secondary battery using the lamination-type internal electrode body, similarly to the foregoing lithium secondary battery using the wound-type internal electrode body, it is preferable to design the battery so that when the battery capacity is C (Ah), and the total area of the opening portions where the pressure release mechanisms operate is S ($cm^2$), the relation of $0.05 \leq S/C \leq 2$ is established. This is because even if the structure of the internal electrode body is of the lamination-type, there is no substantial difference in operation as the battery between the lamination-type internal electrode body and the wound-type internal electrode body.

The above description has been made to the case where the pressure release mechanisms are disposed at two portions, that is, in both end portions when a wound-type internal electrode body is used, or in each of the two facing surfaces in the laminate side when a lamination-type internal electrode body is used. However, it is needless to say that more pressure release mechanisms may be disposed as long as the conditions of the disposed position and the shape are satisfied. However, since the provision of many pressure release mechanisms results in complication of the battery structure and increase of part cost and manufacturing cost, it is preferable to suppress the shape and disposing number to the minimum within the range that the safety of the battery can be secured.

On the other hand, even in a lithium secondary battery in which the pressure release mechanism is disposed at only one portion, as is seen in the foregoing nail piercing test result of the small lithium secondary battery, if the condition of provision is suitably determined in relation to the battery capacity, it is possible to secure the safety. In this case, design is made so that when the battery capacity is C (Ah), and the total area of opening portion where the pressure release mechanism operates is S ($cm^2$), the relation of $0.5 \leq S/C \leq 2$ is established. Although the structure of an internal electrode body in this case may be of the wound-type or lamination-type, the position of the disposed pressure release mechanism is the end or side of the battery case corresponding to the side of the electrode plate.

An internal electrode body used for a lithium secondary battery satisfying this relation may be a wound type or a lamination type. When a wound-type internal electrode body is employed, the pressure release mechanism is disposed in at least one portion at one end of the battery case in the winding axis direction. When a lamination-type internal electrode body is employed, totally at least one pressure release mechanism is disposed on a side surface of the battery case perpendicular to a flat plate surface of the electrode plate or on each of at least two surfaces not facing to one another of the battery case.

In this case, the lower value of S/C is 0.5 which is larger than the case where the pressure release mechanisms are disposed at two portions, and like this, when the opening area of the pressure release mechanism is made large with respect to the battery capacity, release of the internal pressure becomes easy. As a result, it is possible to decrease the load of pressure to the end where the pressure release mechanism is not disposed, and it becomes possible to prevent the burst or firing of the battery. This condition is also a condition that the opening area of the pressure release mechanism restricts the shape of the battery. That is, according to the battery capacity, according to the value of S/C, a minimum area of an end surface or a side of a battery case which is necessary to dispose the pressure release mechanism having a certain opening area, is determined, and as a result, the length of the electrode plate in the winding axis direction is determined in the wound-type internal electrode body, and the area of the flat surface of the electrode plate is determined in the lamination-type internal electrode body.

For example, in the case of fabricating a battery including a wound-type internal electrode body and capacity C, in which pressure release mechanisms are disposed at two portions, since a minimum opening area S is 0.05 C, and this can be divided to both ends, the area at one end necessary for a battery case becomes 0.025 C. On the other hand, in the case where the battery is formed while the pressure release mechanism is disposed at one portion, a minimum opening area S becomes 0.5 C. In this case, the area at one end requires the area of 0.5 C. Of course, although the area of one end of the battery case does not completely coincide with the opening area of the pressure release mechanism, in the case where the pressure release mechanism is disposed at only one portion, it becomes necessary to make the end area about 20 times as large as that in the case where the pressure release mechanisms are disposed at two portions. Here, since the battery capacity is the same, in the case where the pressure release mechanisms are disposed at two portions, it is possible to produce a column type battery which is long in the winding axis direction. Conversely, since it is possible to shorten the length in the winding axis direction by increasing the area at one end, the degree of freedom in designing a shape is high. On the other hand, in the case where the pressure release mechanism is disposed at only one portion, that the battery must be a thin battery having a long diameter by shortening the length in a winding axis direction and increasing the number of winding.

Figure 2:
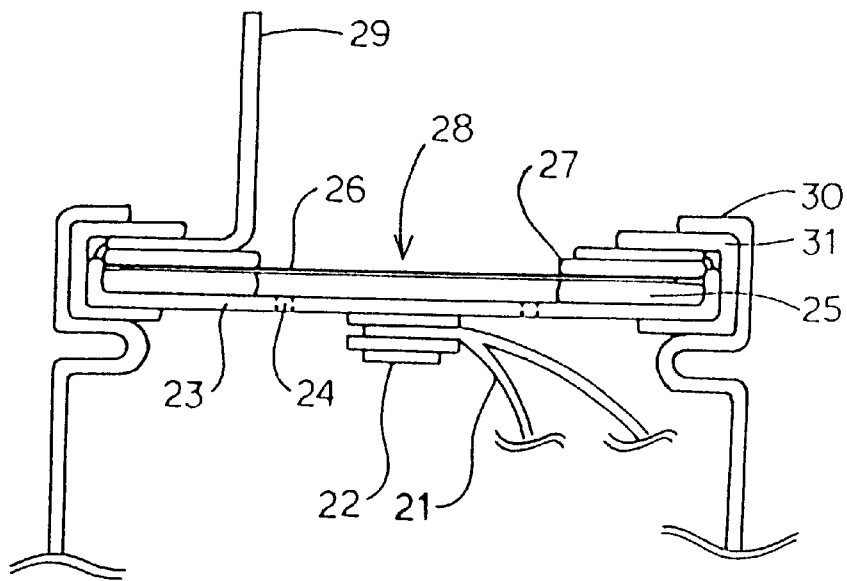
FIG. 2 is a sectional view showing an embodiment of a pressure release mechanism adopted for the lithium secondary battery of the present invention.

With respect to the foregoing lithium secondary battery, in addition to the pressure release mechanism shown in FIG. 1, various pressure release mechanisms can be applied. FIG. 2 is a sectional view showing another embodiment of a pressure release mechanism disposed in the lithium secondary battery of the present invention. The connection between an electrode plate (not shown) and lead lines 21, and the connection of the lead lines 21 to a rivet 22 are the same as the lithium secondary battery shown in FIG. 1.

An internal terminal 23 includes a side wall, and is shaped into a cylinder with a bottom provided with a communication hole 24. A first seal ring 25 is fitted to the inner bottom portion of the internal terminal 23, a metal foil 26 is overlapped with the first seal ring 25, and a second seal ring 27 is overlapped with the metal foil 26, so that the metal foil 26 is fixed and sandwiched between the first seal ring 25 and the second seal ring 27. In this way, a pressure release hole 28 is formed at the center of the metal foil 26 and functions as a pressure release mechanism inside of the battery. The material of the metal foil 26 is preferably selected from aluminum, copper and nickel according to whether it is applied to a positive electrode or a negative electrode.

Further, an output terminal 29 of a ring shape with a protrusion is overlapped on the second seal ring 27, and the output terminal 29 is electrically connected to the upper portion of an outer peripheral wall of the internal terminal 23 in such a manner that the vertical position can be adjusted by a metal wire or the like. Moreover, the upper end portion of a battery case 30 is bent and is subjected to caulking, so that the internal terminal 23, members fitted into the inside thereof, and the output terminal 29 are fixed in the battery.

At this time, a heat shrinkage tube 31 as an insulator is inserted between the internal terminal 23 and the battery case 30 so that the internal terminal 23 does not come in contact with the battery case 30. In the case where output terminals of positive and negative electrodes are disposed at one end of the battery case 30, the battery case 30 is made a current path of one electrode, and like the structure of the negative electrode side of FIG. 1, the other output terminal is inserted and fixed between the battery case 30 and the heat shrinkage tube 31 at the bent position of the upper end of the battery case 30.

Figure 3:
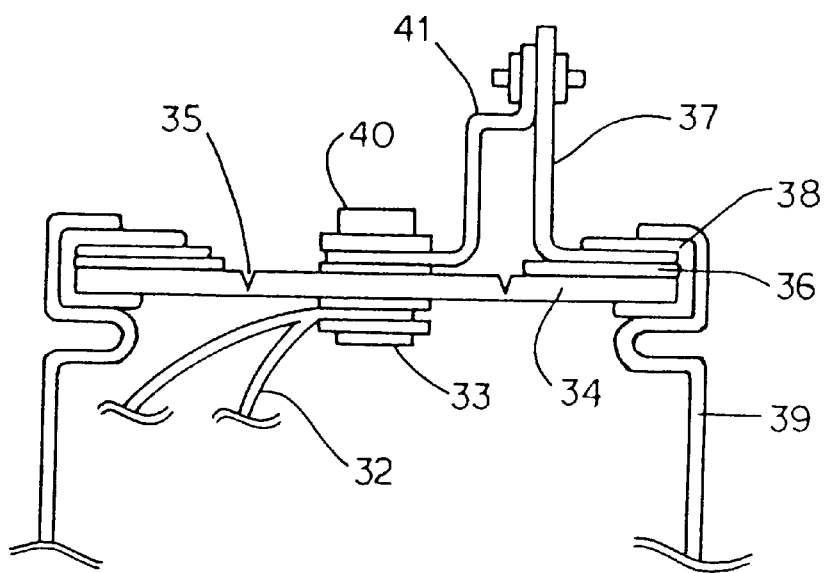
FIG. 3 is a sectional view showing another embodiment of the pressure release mechanism adopted for the lithium secondary battery of the present invention.

FIG. 3 shows still another embodiment of a pressure release mechanism disposed in the lithium secondary battery of the present invention. Lead lines 32 the other end of which is connected to an internal electrode body (not shown) are connected to a rivet 33, and the rivet 33 is connected to a terminal plate 34 by welding or the like. A V-shaped groove 35 as a burst groove is formed in the terminal plate 34 like the battery cap 85 used in the end of the positive electrode in FIG. 1, and functions as a pressure release mechanism for the internal pressure of the battery.

An output terminal 37 is disposed on the terminal plate 34 through an insulating ring 36 made of polypropylene or the like, and caulking of a battery case 39 is carried out while these do not come in contact with the battery case 39 through an insulating thermal shrinkage tube 38. Further, a terminal portion 40 is disposed at the outside of the terminal plate 34, and a temperature fuse and/or current fuse 41 is connected to the output terminal 37 to form a current path from the internal electrode body to the output terminal 37.

In such a pressure release mechanism, in the case where the temperature of the battery is raised or overcurrent flows, the temperature fuse and/or current fuse 41 is first cut off to break current, and when the internal pressure of the battery is further increased, the V-shaped groove 35 is burst to release the internal pressure of the battery to the atmospheric pressure.

Although the structural conditions and pressure release mechanism of the lithium secondary battery of the present invention have been described, it is needless to say that the same pressure release mechanism may be adopted for both electrode portions of one battery, or a pressure release mechanism of different structure may be arbitrarily selected. Moreover, an output terminal for each of positive and negative electrodes may be disposed at each end of the battery, while positive and negative electrodes are concentrically disposed at one end of the battery.

The structural condition of the thus fabricated lithium secondary battery of the present invention is preferably applied to a large capacity battery with a battery capacity of 5 Ah or more, and such a large capacity battery is preferably used as a battery for an EV and an HEV. However, it is needless to say that the present invention can also be used for the structure of a small battery.

EXAMPLES

Hereinafter, description will be made to Example 1 and Example 2 with respect to a pressure release mechanism applied to a lithium secondary battery of the present invention, and Example 3 with respect to the relation between the battery capacity and the opening area of a pressure release mechanism.

Figure 4:
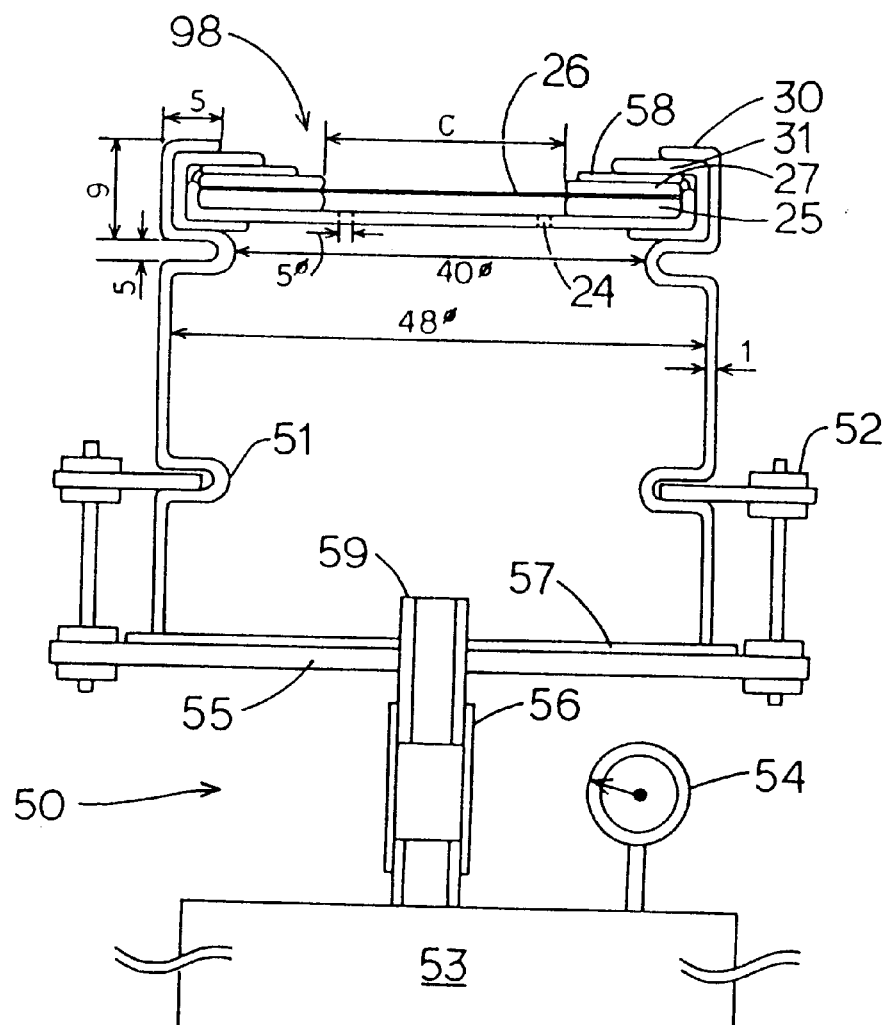
FIG. 4 is an explanatory view showing a sample for an operation test of the pressure release mechanism adopted in the lithium secondary battery of the present invention, and the structure of an apparatus for the operation test.

First, FIG. 4 is an explanatory view of an apparatus 50 for carrying out an operation test (pressure withstand test) of a pressure release mechanism applied to the lithium secondary battery of the below Examples 1 and 2 of the present invention. As a sample 98, one having the structure of the pressure release mechanism shown in FIG. 2 is shown. However, as the sample 98, one in which the internal electrode body and electrode terminals were removed, was used.

A squeezed portion 51 for fixing the sample 98 is formed in a battery case 30. By using a fixing jig 52, the battery case 30 is airtightly fixed while the battery case is pressed against a sample support 55 through a spacer 57 such as a silicon rubber plate. A pressure inlet pipe 59 is disposed at the center of the sample support 55, and is connected to a hydraulic pump 53 through a connection pipe 56. In this way, when the hydraulic pump 53 is operated to pressurize the inside of the battery case 30, the metal foil 26 bursts at certain pressure so that the inner pressure is released to the atmospheric pressure. By confirming the maximum hydraulic pressure before the release of pressure by a waterpressure gauge 54, the operational pressure of the pressure release mechanism can be known.

In the case where water leak from the sample 98 occurs in the state where a hydraulic pressure is applied to the sample 98, the water leak can be regarded as liquid leak of an electrolyte in an actual battery. Thus, the relation between the structural strength of each portion in the structure of the lithium secondary battery of the present invention and the operation of the pressure release mechanism can be known.

Example 1

As shown in FIG. 4, the sample 98 is constructed such that an aluminum pipe with an outer diameter of 50 mm$\phi$ and a thickness of 1 mm is used as the battery case 30, nitrile rubber rings with a thickness of 2 mm are used as the first and second seal rings 25 and 27, an aluminum press ring 58 with a thickness of 1 mm is used instead of the output terminal 29 in FIG. 2, and a tube with a thickness of 2 mm is used as the heat shrinkage tube 31. An internal electrode body and electrode terminals are not provided in the sample. The diameter of the pressure release hole 24 is 5 mmϕ. In addition, sizes (unit: mm) of a caulking space and the like in the sample 98 are shown in FIG. 4. In FIG. 4, in order to clarify the structure of the sample 98, the scale of each portion of the sample 98 is not constant.

A copper foil and an aluminum foil were used as the metal foil 26, and while the diameter C of the seal ring and the thickness of the metal foil 26 were changed, the pressure in the inside of the sample 98 was raised. Then the operational pressure of the pressure release mechanism, that is, the burst pressure of the metal foil 26 was measured. The test result is shown in Table 1 and FIG. 5.

TABLE 1

| Sample No. | Metal foil Material | Thickness ($\mu$m) | Seal ring diameter (mm) | Operational pressure (kg/cm$^2$) | State of sealing |
|---|---|---|---|---|---|
| 1 | copper | 10 | 2.5 | 10.8 | leaked at seal portion |
| 2 | copper | 10 | 5 | 5.3 | good |
| 3 | copper | 10 | 10 | 2.4 | good |
| 4 | copper | 10 | 15 | 1.8 | good |
| 5 | copper | 10 | 25 | 1 | good |
| 6 | copper | 10 | 30 | 0.7 | good |
| 7 | copper | 30 | 15 | 14.5 | leaked at seal portion |
| 8 | copper | 30 | 25 | 7.6 | good |
| 9 | copper | 30 | 30 | 7 | good |
| 10 | copper | 50 | 25 | 12.2 | leaked at seal portion |
| 11 | copper | 50 | 30 | 8.8 | good |
| 12 | aluminum | 20 | 5 | 11.3 | leaked at seal portion |
| 13 | aluminum | 20 | 10 | 5.8 | good |
| 14 | aluminum | 20 | 15 | 4 | good |
| 15 | aluminum | 20 | 25 | 2.5 | good |
| 16 | aluminum | 20 | 30 | 2.2 | good |
| 17 | aluminum | 50 | 10 | 12.6 | leaked at seal portion |
| 18 | aluminum | 50 | 15 | 8.6 | good |
| 19 | aluminum | 50 | 25 | 6.2 | good |
| 20 | aluminum | 50 | 30 | 5.6 | good |

(Note) State of sealing: state of damage or leak at the seal portion when the safety mechanism operates.

From Table 1, when the operational pressure of the pressure release mechanism exceeded 10 kg/cm$^2$, the sealing portion formed by bending and caulking the battery case 30 at the end of the battery was deformed so that water leak occurred in the case where a copper foil was used and when the thickness of the copper foil was 10 $\mu$m and the diameter C of the seal ring was not larger than 2.5 mmϕ, when the thickness of the copper foil was 30 $\mu$m and the diameter C of the seal ring was not larger than 15 mmϕ, or when the thickness of the copper foil was 50 $\mu$m and the diameter C of the seal ring was not larger than 25 mmϕ, or in the case where the aluminum foil was used and when the thickness of the aluminum foil was 20 $\mu$m and the diameter C of the seal ring was not larger than 5 mmϕ, or when the thickness of the aluminum foil was 50 $\mu$m and the diameter C of the seal ring was not larger than 10 mmϕ. In other conditions, the pressure release mechanism normally operated to release the inner pressure of the sample 98, and leak of a liquid from the seal portion was not seen.

From this result, it has been judged that it is preferable to make the burst pressure of the metal foil 26 10 kg/cm$^2$ or less at which the deformation and water leak at the seal portion does not occur, and in order to quickly release the inner pressure of the test sample 98, it is preferable to make the diameter C of the seal ring 10 mm or more. Incidentally, since this test is carried out in such a state that the outside atmosphere of the test sample is in the state of the atmospheric pressure, the burst pressure, that is, the operational pressure of the pressure release mechanism means a differential pressure between the inside of the battery and the outside.

Figure 5:
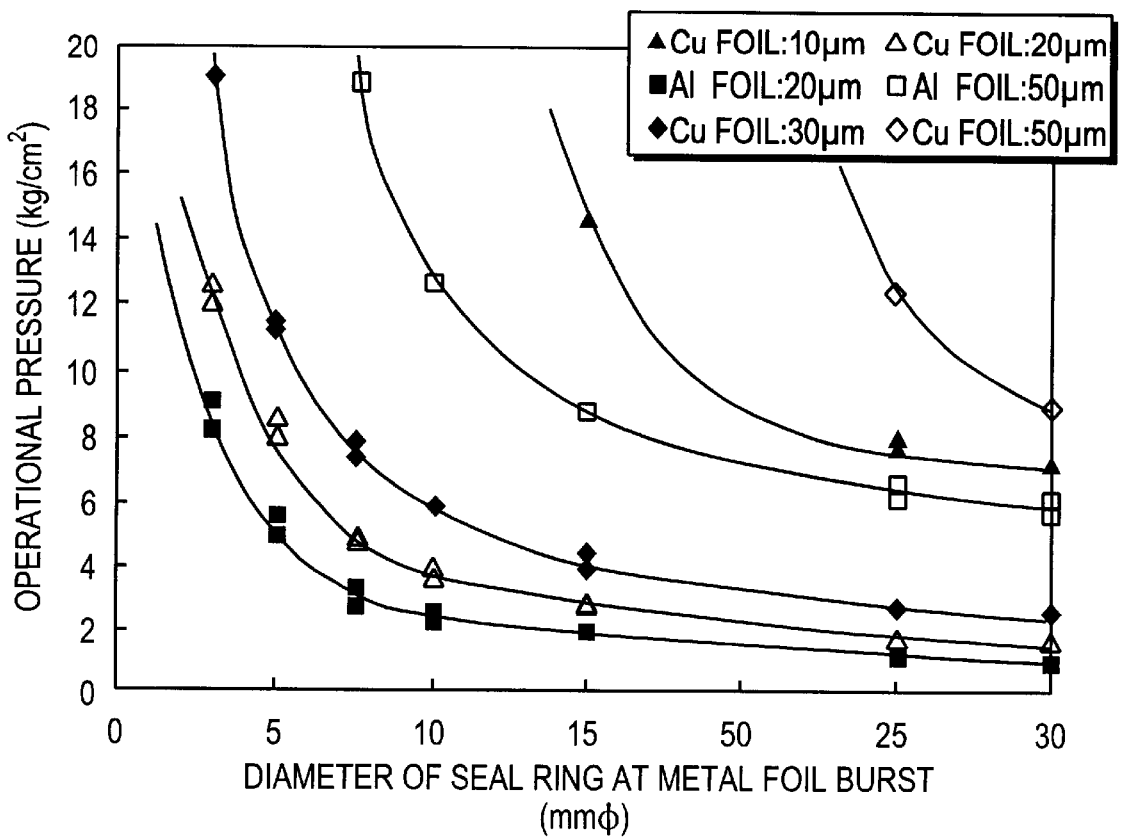
FIG. 5 is a graph showing the result of an operation test of the pressure release mechanism using a metal foil.

The burst pressure of the metal foil 26 may be set suitably in accordance with the relation among the thickness of the metal foil 26, the diameter C of the seal ring at the burst of the metal foil, and the operational pressure (burst pressure of the metal foil) as shown in FIG. 5. From various curves shown in FIG. 5, it is possible to expect the rough burst pressure of a metal foil with a thickness different from that of the metal foil 26 used in this test. In an actual lithium secondary battery, at a normal use state or a fabrication of the battery, since the pressure of the inside of the battery is increased to about 1.5 kg/cm$^2$, it is preferable to set the burst pressure so that the burst pressure of the metal foil 26 does not become 2 kg/cm$^2$ or less.

Example 2

Figure 6:
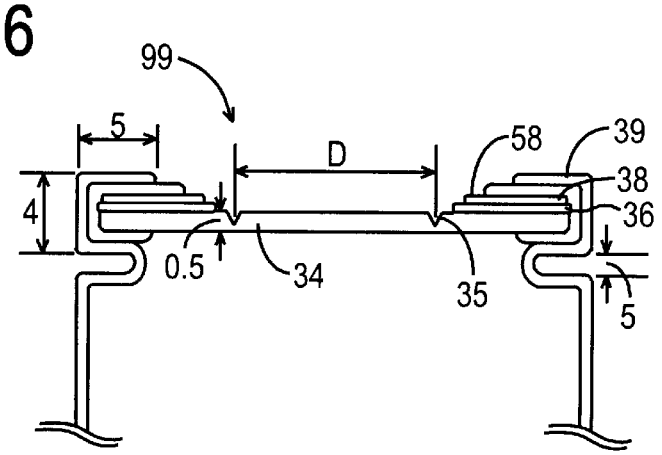
FIG. 6 is an explanatory view showing the structure of a sample for an operation test of another pressure release mechanism adopted in the lithium secondary battery of the present invention.

FIG. 6 shows the structure of a test sample 99 obtained by removing the internal electrode body and members such as an electrode terminal from the pressure release mechanism shown in FIG. 3. A battery case 39 is the same as the battery case 30 used in the test sample 98 shown in FIG. 4. An insulating ring 36 made of nitrile rubber with a thickness of 2 mm and an aluminum press ring 58 with a thickness of 2 mm are overlapped on a terminal plate 34 with a thickness of 0.5 mm and having an annular V-shaped groove 35 with a diameter of D, the outer peripheral portions of these are wrapped with a heat shrinkage tube 38 having a thickness of 2 mm, and are fixed to the inside of the battery case 39 by caulking. By using the thus fabricated test sample 99, and in the same way as the Example 1, the operational pressure of the pressure release mechanism, that is, the burst pressure of the V-shaped groove 35 was measured. The test result is shown in Table 2 and FIG. 7.

TABLE 2

| Sample No. | V-shaped groove Material of terminal plate | Diameter of groove (mm) | Thickness of groove portion (mm) | Operational pressure (kg/cm$^2$) | Sealing state |
|---|---|---|---|---|---|
| 21 | copper | 15 | 0.05 | 10.5 | leaked at seal portion |
| 22 | copper | 20 | 0.05 | 8.0 | good |
| 23 | copper | 30 | 0.05 | 5.4 | good |
| 24 | copper | 40 | 0.05 | 2.2 | good |
| 25 | copper | 20 | 0.08 | 12.2 | leaked at seal portion |
| 26 | copper | 30 | 0.08 | 9.8 | good |
| 27 | copper | 40 | 0.08 | 8.4 | good |
| 28 | copper | 30 | 0.10 | 12.0 | leaked at seal portion |
| 29 | copper | 40 | 0.10 | 10.0 | good |
| 30 | aluminum | 10 | 0.08 | 10.5 | leaked at seal portion |
| 31 | aluminum | 20 | 0.08 | 6.3 | good |
| 32 | aluminum | 30 | 0.08 | 4.2 | good |

TABLE 2-continued

| Sample No. | V-shaped groove | | | | |
| --- | --- | --- | --- | --- | --- |
| | Material of terminal plate | Diameter of groove (mm) | Thickness of groove portion (mm) | Operational pressure (kg/cm$^2$) | Sealing state |
| 33 | aluminum | 40 | 0.08 | 2.3 | good |
| 34 | aluminum | 15 | 0.10 | 11.4 | leaked at seal portion |
| 35 | aluminum | 20 | 0.10 | 9.0 | good |
| 36 | aluminum | 30 | 0.10 | 6.5 | good |
| 37 | aluminum | 40 | 0.10 | 4.5 | good |
| 38 | aluminum | 20 | 0.15 | 12.0 | leaked at seal portion |
| 39 | aluminum | 30 | 0.15 | 9.5 | good |
| 40 | aluminum | 40 | 0.15 | 7.0 | good |

(Note) Sealing state: a state of damage or leak at a seal portion when the safety mechanism operates.

From Table 2, when the operational pressure of the pressure release mechanism exceeded 10 kg/cm$^2$, the seal portion formed by bending and caulking the battery case 39 at the end of the battery was deformed so that water leak occurred in the case where the terminal plate 34 made of copper was used and when the thickness of the V-shaped groove 35 was 0.05 mm and the diameter D of the V-shaped groove was 15 mm or less, when the thickness of the V-shaped groove 35 was 0.08 mm and the diameter D of the V-shaped groove was 20 mm or less, or when the thickness of the V-shaped groove 35 was 0.10 mm and the diameter D of the V-shaped groove was 30 mm or less, or in the case where the terminal plate 34 of aluminum was used and when the thickness of the V-shaped groove 35 was 0.08 mm and the diameter D of the V-shaped groove was 10 mm or less, when the thickness of the V-shaped groove 35 was 0.10 mm and the diameter D of the V-shaped groove was 15 mm or less, or when the thickness of the V-shaped groove 35 was 0.15 mm and the diameter D of the V-shaped groove was 20 mm or less.

From the test result, it has been judged that it is preferable to make the burst pressure of the V-shaped groove 35 10 kg/cm$^2$ or less at which the deformation and water leak at the seal portion do not occur, and in order to quickly release the inner pressure of the test sample 99, it is preferable to make the diameter of the V-shaped groove 10 mm or more.

Figure 7:
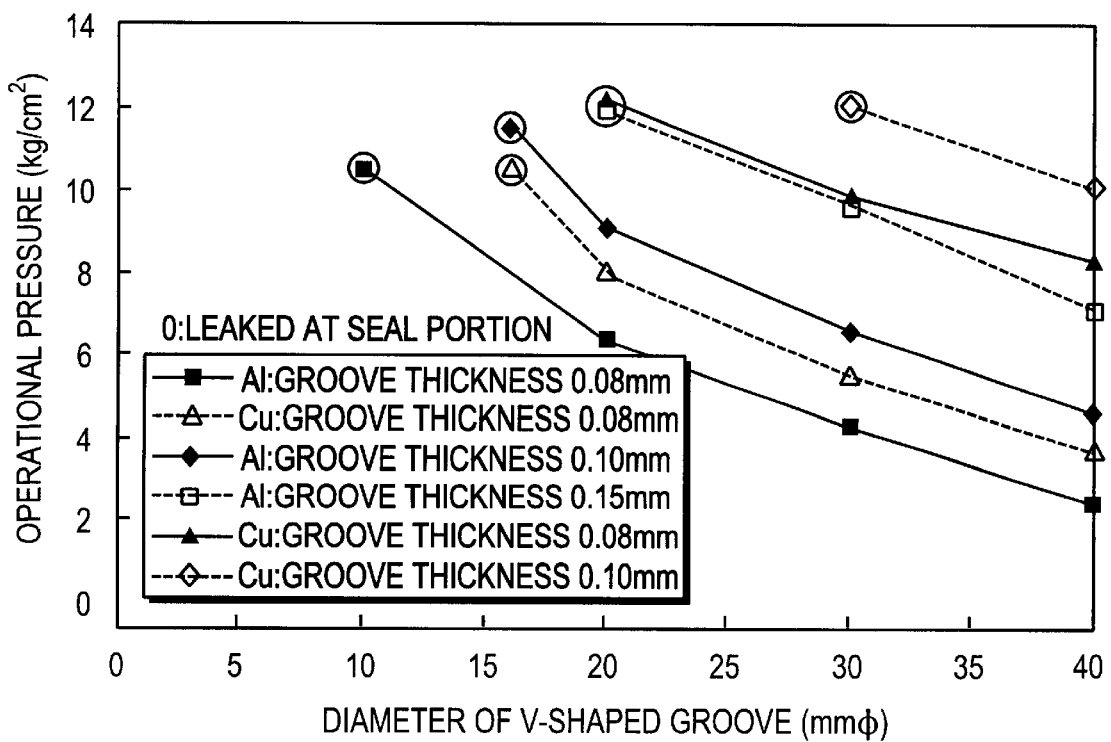
FIG. 7 is a graph showing the result of an operation test of the pressure release mechanism using a V-shaped groove.

The burst pressure of such V-shaped groove 35 can be suitably selected in accordance with the relation among the groove thickness of the V-shaped groove 35, the diameter D of the V-shaped groove, and the operational pressure in FIG. 7. With respect to conditions other than the condition set in this test, it is possible to expect a rough burst pressure of the V-shaped groove 35 from FIG. 7. As described before, in an actual lithium secondary battery, since the pressure of the inside of the battery increased to about 1.5 kg/cm$^2$ at a normal use state, in the case where the V-shaped groove 35 is used, it is also preferable to set the burst pressure so that it does not become 2 kg/cm$^2$ or less.

Example 3

Both-end pressure-release-type batteries including the pressure release mechanisms shown in FIG. 1 at both ends of the battery case were fabricated while the values of S/C were changed. Moreover, single-end pressure-release-type batteries were fabricated while the values of S/C were changed. In the single-end pressure-release-type battery, the pressure release mechanism using the metal foil in the battery structure shown in FIG. 1 is disposed at only one end of the battery case, and the V-shaped groove is not formed in the other end so that the pressure release mechanism is not disposed at the other end. Then the operation states of the pressure release mechanisms were examined by fully charging the batteries through a constant current and carrying out the nail piercing test.

Here, the positive electrode was formed of an aluminum foil coated with a mixture in which carbon powder (acetylene black) for improving the conductivity was added to lithium manganese oxide (LiMn$_2$O$_4$) as a positive active material. The negative electrode was formed of a copper foil coated with graphite powder. As a separator for separating the positive electrode from the negative electrode, a micro porous separator made of polypropylene was used. The electrolyte was prepared by dissolving an LiPF$_6$ electrolyte in a mixed solution of ethylene carbonate (EC) and diethyl carbonate (DEC). As the battery case, an aluminum cylindrical member with a thickness of 1 mm was used.

At this time, the length of the cylinder (length of the electrode plate in the winding axis direction) and the area of the end of the cylinder were adjusted according to necessity so that the entire battery capacity became 25 Ah. In the both-end pressure-release-type battery, the area of the opening portion of the pressure release mechanisms of the respective ends were set identical, so that they were equal to each other. The test result is shown in Table 3.

TABLE 3

| Type of battery | S/C (cm$^2$/Ah) | Test result and state |
| --- | --- | --- |
| Both-end release type | 0.01 | Terminal end of battery case burst, and gas spouted. |
| Both-end release type | 0.03 | Terminal end of battery case burst, and gas spouted. |
| Both-end release type | 0.05 | good |
| Both-end release type | 0.1 | good |
| Both-end release type | 0.5 | good |
| Both-end release type | 1.0 | good |
| Both-end release type | 2.0 | good |
| Both-end release type | 3.0 | (good) |
| Both-end release type | 5.0 | (good) |
| Single-end release type | 0.05 | Battery case burst, and then fired. |
| Single-end release type | 0.5 | good |
| Single-end release type | 1.0 | good |
| Single-end release type | 2.0 | good |
| Single-end release type | 3.0 | Internal electrode body moved. |

From the test result of Table 3, in the both-end release-type battery, such a state was observed that in some batteries having an S/C value of less than 0.05, electrode materials and the like were clogged in the opening portion of the pressure release mechanism so that the battery case burst, or although the battery case did not burst seriously, a crack was produced at a portion other than the opening portion of the pressure release mechanism and gas spouted from this crack. On the other hand, when the S/C value is larger than 2, any problem did not occur in the operation of the pressure release mechanism, and since a nail was pierced in the internal electrode body, a part of the internal electrode body did not jump out of the opening portion. However, in the case where an external short circuit occurs, there is a possibility that a part of the internal electrode body jumps out of the opening portion. When the S/C value is made large, the cylinder of the battery becomes large. Thus, when the battery is installed on an electric vehicle, a dead space for the arrangement becomes large, so that this is not preferable.

On the other hand, in the single-end pressure-release type battery, in the case where the value of S/C was less than 0.5, it was observed that the battery case burst at a portion of the end where the pressure release mechanism was disposed, other than the pressure release mechanism, or at the end where the pressure release mechanism was not disposed, and vapor, which was presumed to be a product formed by evaporation of the electrolyte, and the electrolyte spouted. In the case where the value of S/C is larger than 2, similarly to the case of the both-end release-type battery, although there arose no problem on the operation of the pressure release mechanism, it was observed that the internal electrode body moved slightly to the side of the opening portion. This suggests a possibility that a part of the internal electrode body jumps out of the opening portion of the pressure release mechanism.

As described above, according to the lithium secondary battery of the present invention, even in the case where the internal pressure of the battery is increased by an accident such as an external and/or internal short circuit of the battery, since the pressure release mechanism which operates at a proper battery inner pressure and is set into a suitable shape is disposed at the end of the battery case or at suitable position of the side of the battery case, the internal pressure of the battery is safely released. Accordingly, there does not arise such an accident that the battery bursts or jumps out of a part of the internal electrode body, and the lithium secondary battery has an effect that it is excellent in safety. In addition, since the structure of the battery is simple, the fabrication thereof is easy and the manufacturing cost can be reduced. Further, since metal is used as the member for the current breaking mechanism, the lithium secondary battery has an advantage that the charging/discharging characteristics are excellent without increasing the internal resistance of the battery.

What is claimed is:

1. A lithium secondary battery, comprising:
 a battery case;
 an internal electrode body contained in the battery case and including a lithium-containing positive electrode, a negative electrode, and a separator made of porous polymer, the positive electrode and the negative electrode being wound through the separator so that the positive electrode and the negative electrode are not brought into direct contact with each other;
 an organic electrolyte contained in the battery case; and
 a pressure release mechanism disposed at each of both end portions of the battery case in a winding direction of the positive electrode and the negative electrode, wherein battery capacity is not less than 5 Ah and when battery capacity is C(Ah) and the total area of opening portions where the pressure release mechanisms operate is S(cm$^2$), the relation of $0.05 \leq S/C \leq 2$ is established.

2. A lithium secondary battery according to claim 1, wherein the battery case is cylinder-shaped.

3. A lithium secondary battery according to claim 1, wherein at least one of said pressure release mechanism is disposed at each of both end portions of the battery case.

4. A lithium secondary battery according to claim 1, wherein an operational pressure of the pressure release mechanism is 2 to 10 kg/cm$^2$.

5. A lithium secondary battery according to claim 1, wherein a difference in operational pressures of the installed pressure release mechanisms is 8 kg/cm$^2$ or less.

6. A lithium secondary battery according to claim 1, wherein the pressure release mechanism includes a metal foil which bursts to release an internal pressure of the battery to an outside pressure.

7. A lithium secondary battery according to claim 6, wherein the metal foil disposed at a positive side is made of aluminum, and the metal foil disposed at a negative side is made of copper or nickel.

8. A lithium secondary battery according to claim 1, wherein the pressure release mechanism includes a groove portion disposed in a metal plate, the groove portion being burst so that an internal pressure of the battery is released to an outside pressure.

9. A lithium secondary battery according to claim 8, wherein the metal plate disposed at a positive side is made of aluminum, and the metal plate disposed at a negative side is made of copper or nickel.

10. A lithium secondary battery according to claim 1, wherein the battery is used for an electric vehicle or a hybrid electric vehicle.

11. A lithium secondary battery, comprising:
 a battery case;
 an internal electrode body contained in the battery case and including a lithium-containing positive electrode, a negative electrode, and a separator made of porous polymer, the positive electrode and the negative electrode being laminated through the separator so that the positive electrode and the negative electrode are not brought into direct contact with each other,
 an organic electrolyte contained in the battery case; and
 at least one pressure release mechanism disposed on two or more side surfaces facing each other, perpendicular to flat surfaces of said positive electrode and said negative electrode, of the battery case, wherein battery capacity is not less than 5 Ah and when battery capacity is C(Ah) and the total area of opening portions where the pressure release mechanisms operate is S(cm$^2$), the relation of $0.05 \leq S/C \leq 2$ is established.

12. A lithium secondary battery according to claim 11, wherein said pressure release mechanism is disposed on each of at least one pair of facing side surfaces of the battery case.

13. A lithium secondary battery according to claim 11, wherein an operational pressure of the pressure release mechanism is 2 to 10 kg/cm$^2$.

14. A lithium secondary battery according to claim 11, wherein a difference in operational pressures of the installed pressure release mechanisms is 8 kg/cm$^2$ or less.

15. A lithium secondary battery according to claim 4, wherein the pressure release mechanism includes a metal foil which bursts to release an internal pressure of the battery to an outside pressure.

16. A lithium secondary battery according to claim 15, wherein the metal plate disposed at a positive side is made of aluminum, and the metal plate disposed at a negative side is made of copper or nickel.

17. A lithium secondary battery according to claim 11, wherein the pressure release mechanism includes a groove portion disposed in a metal plate, the groove portion being burst so that an internal pressure of the battery is released to an outside pressure.

18. A lithium secondary battery according to claim 17, wherein the metal plate disposed at a positive side is made of aluminum, and the metal plate disposed at a negative side is made of copper or nickel.

19. A lithium secondary battery according to claim 11, wherein the battery is used for an electric vehicle or a hybrid electric vehicle.

20. A lithium secondary battery, comprising:
 a battery case;

an internal electrode body contained in the battery case and including a lithium-containing positive electrode, a negative electrode, and a separator made of porous polymer, the positive electrode and the negative electrode being wound through the separator so that the positive electrode and the negative electrode are not brought into direct contact with each other;

an organic electrolyte contained in the battery case; and at least one pressure release mechanism disposed in one end portion of the battery case in a winding direction of said internal electrode body, wherein the battery capacity is not less than 5 Ah and when the total area of an opening portion where the pressure release mechanism operates is S ($cm^2$) and capacity of the lithium battery is C (Ah), the relation of $0.5 \leq S/C \leq 2$ is established.

21. A lithium secondary battery according to claim 20, wherein the pressure release mechanism includes a metal foil which bursts to release an internal pressure of the battery to an outside pressure.

22. A lithium secondary battery according to claim 21, wherein the metal foil disposed at a positive side is made of aluminum, and the metal foil disposed at a negative side is made of copper or nickel.

23. A lithium secondary battery according to claim 20, wherein the pressure release mechanism includes a groove portion disposed in a metal plate, the groove portion being burst so that an internal pressure of the battery is released to an outside pressure.

24. A lithium secondary battery according to claim 23, wherein the metal plate disposed at a positive side is made of aluminum, and the metal plate disposed at a negative side is made of copper or nickel.

25. A lithium secondary battery according to claim 20, wherein an area of an opening of the pressure release mechanism is not less than 0.1 $cm^2$.

26. A lithium secondary battery according to claim 20, wherein the battery is used for an electric vehicle or a hybrid electric vehicle.

27. A lithium secondary battery, comprising:

a battery case;

an internal electrode body contained in the battery case and including a lithium-containing positive electrode, a negative electrode, and a separator made of porous polymer, the positive electrode and the negative electrode being laminated through the separator so that the positive electrode and the negative electrode are not brought into direct contact with each other;

an organic electrolyte contained in the battery case; and at least one pressure release mechanism disposed only on a side surface perpendicular to flat surfaces of said positive electrode and said negative electrode or on each of at least two of not facing side surfaces, of the battery case, wherein the battery capacity is not less than 5 Ah and when the total area of an opening portion where the pressure release mechanism operates is S ($cm^2$) and capacity of the lithium battery is C (Ah), the relation of $0.5 \leq S/C \leq 2$ is established.

28. A lithium secondary battery according to claim 27, wherein the pressure release mechanism includes a metal foil which bursts to release an internal pressure of the battery to an outside pressure.

29. A lithium secondary battery according to claim 28, wherein the metal plate disposed at a positive side is made of aluminum, and the metal plate disposed at a negative side is made of copper or nickel.

30. A lithium secondary battery according to claim 27, wherein the pressure release mechanism includes a groove portion disposed in a metal plate, the groove portion being burst so that an internal pressure of the battery is released to an outside pressure.

31. A lithium secondary battery according to claim 30, wherein the metal plate disposed at a positive side is made of aluminum, and the metal plate disposed at a negative side is made of copper or nickel.

32. A lithium secondary battery according to claim 27, wherein an area of an opening of the pressure release mechanism is not less than 0.1 $cm^2$.

33. A lithium secondary battery according to claim 27, wherein the battery is used for an electric vehicle or a hybrid electric vehicle.

* * * * *